United States Patent [19]

Rosenquist

[11] Patent Number: 4,533,690

[45] Date of Patent: Aug. 6, 1985

[54] FLAME RETARDANT POLYCARBONATE COMPOSITIONS

[75] Inventor: Niles R. Rosenquist, Evansville, Ind.

[73] Assignee: General Electric Company, Mt. Vernon, Ind.

[21] Appl. No.: 603,920

[22] Filed: Apr. 26, 1984

[51] Int. Cl.³ ............................................. C08K 5/42
[52] U.S. Cl. ..................................... 524/161; 524/611
[58] Field of Search ....................... 524/161, 611, 155

[56] References Cited

U.S. PATENT DOCUMENTS

| | | | |
|---|---|---|---|
| 4,104,245 | 8/1978 | Mark | 524/161 |
| 4,115,354 | 9/1978 | Mark et al. | 524/161 |
| 4,197,232 | 4/1980 | Bialous et al. | 524/161 |
| 4,220,583 | 9/1980 | Mark | 524/161 |
| 4,239,678 | 12/1980 | Williams | 524/161 |

FOREIGN PATENT DOCUMENTS

| | | | |
|---|---|---|---|
| 0034191 | 9/1974 | Japan | 524/161 |
| 0198745 | 12/1982 | Japan | 524/161 |

Primary Examiner—Lester L. Lee
Attorney, Agent, or Firm—Martin B. Barancik

[57] ABSTRACT

A composition comprising an admixture of an aromatic polycarbonate and a flame retardant effective amount of a compound of the formula

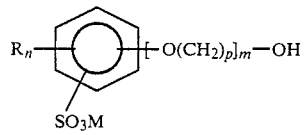

wherein
M is an alkali or alkaline earth metal;
R is alkyl, halo, nitro, trihalomethyl or cyano;
m is an integer of one to about ten;
n is an integer of zero, one, two, three or four; and
p is an integer of two, three, four, five or six.

19 Claims, No Drawings

FLAME RETARDANT POLYCARBONATE COMPOSITIONS

BACKGROUND OF THE INVENTION

One of the significant problems inhibiting the further use of synthetic materials is the innate flammability of certain materials, particularly plastics. Recently certain additives have been added to plastics which provide new compositions that have substantially increased resistance to flammability. Such a group of additives has been discovered for the polycarbonates. Aromatic sulfonic acid salts and perfluoroaliphatic sulfonic acid salts are well known in the art for their flame retardance activity in polycarbonate.

A new flame retardant additive has been found.

SUMMARY OF THE INVENTION

In accordance with the invention, there is a composition comprising an admixture of an aromatic polycarbonate and a flame retardant effective amount of a compound of the formula

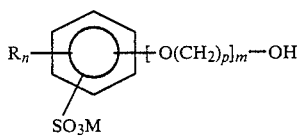

Formula I wherein

M is an alkali or alkaline earth metal;
R is alkyl, halo, nitro, trihalomethyl or cyano;
m is an integer of one to about ten;
n is an integer of zero, one, two, three or four, and
p is an integer of two, three, four, five or six.

Another aspect of the invention are the novel compounds of Formula I, specifically all the compounds of Formula I except where p is two and m is one.

DETAILED DESCRIPTION OF THE INVENTION

In the practice of this invention, any of the aromatic polycarbonates can be employed herein. However, particularly useful are the aromatic polycarbonates prepared by reacting a dihydric phenol, such as bisphenol-A (2,2'-bis(4-hydroxyphenyl)propane) with a carbonate precursor. Typical of some of the dihydric phenols that may be employed in the practice of this invention are bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl) propane, (3,3'-dichloro-4,4'-dihydroxydiphenyl)methane. Other dihydric phenols of the bisphenol type are also available and are disclosed in U.S. Pat. Nos. 2,999,835; 3,028,365 and 3,334,154.

In addition, the reaction is carried out with the carbonate precursor in the presence of a molecular weight regulator, and an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

The aromatic sulfonic acid salts employed as the flame retardant additives in the polycarbonate composition are readily prepared by conventional methods. For example with respect to those compounds having relatively low m values and p equal to 2, the desired compounds can be prepared by reaction of dibasic salts (e.g. disodium salts) of phenol sulfonic acids with the appropriate halogen substituted alcohols or ether-alcohols as described in the examples below. Alternatively, these compounds and compounds with higher m values can be prepared by reaction of the same salts with appropriate quantities of ethylene oxide. When p is more than two appropriate homologs of the above reactants should be employed.

With respect to the compounds of the formula, alkali metals are lithium, sodium, potassium, cesium and rubidium. Alkaline earth metals are beryllium, magnesium, calcium, barium and strontium. Preferred metals are sodium and potassium.

Alkyl include normal or branched alkyl and are preferably of from one to about six carbon atoms. Illustrative examples of preferred alkyl group include methyl, ethyl, isopropyl, n-butyl, isobutyl, n-pentyl, neopentyl, n-hexyl and 2,3-dimethylbutyl.

Halo includes fluoro, chloro, bromo, and iodo. Chloro and bromo are preferred with respect to "halo" mentioned as an R group. In trihalomethyl, the preferred halo is fluoro.

Preferred compounds of the formula as additives in the polycarbonate compositions and as novel compounds are those wherein the oxy alcohol is para to the sulfonic acid salt, p is 2 and m is 3 to 7. R is preferably alkyl, chloro, bromo or trifluoromethyl and n is 0, 1 or 2. The salt form is preferably sodium or potassium.

The additive can be added to the polycarbonate by standard means including addition to the reactor or dry mixing with the polycarbonate powder and extruding together. Other additives and filler can also be present in the composition, for example, thermal stabilizers such as a phosphite, hydrolytic stabilizers such as an epoxide, ultra violet stabilizers such as triazoles, and the like and fillers such as glass fiber, talc, mica and the like.

A flame retarding effective amount of the compound of the formula is employed. Generally, less than 0.01 weight percent of the aromatic polycarbonate will provide an insufficient amount of flame retarding activity. Quantities above about 1.0 weight percent generally do not bring about greater flame retarding activity and/or bring about additional problems such as increased haze. A preferred range of additive is from about 0.02 to about 0.5 weight percent of the aromatic polycarbonate.

Below are examples in accordance with the invention. These examples are intended to illustrate rather than limit the inventive concept.

EXAMPLE I

Preparation of 4(2-Hydroxyethoxy) Benzene Sulfonic Acid Sodium Salt (m=1,p=2)

In a 100 ml one neck round bottom flask were dissolved 0.15 mole (34.8 g) of phenol sulfonic acid sodium salt dihydrate and 0.15 mole (6.0 g) of sodium hydroxide in 75 ml water. 0.15 mole (18.8 g) of 2-bromoethanol was then added. The flask was then stoppered and placed in a hot oil both for three days with the temperature being allowed to rise from 50° to 65° C. over that period. On cooling, a white solid crystallized from the reaction mixture which was collected by vacuum filtration, washed with water and dried to yield a white powder which was characterized by nmr.

EXAMPLE II

Preparation of 4-(2-(2-Hydroxyethoxy)ethoxy) Benzenesulfonic Acid Sodium Salt (m=2,p=2)

In a 250 ml one neck round bottom flask were dissolved 0.2 mole (46.4 g) phenol sulfonic acid sodium salt dihydrate and 0.21 mole (8.4 g) sodium hydroxide in the minimum amount of water required (about 100 ml). To this was added 0.2 mole (25 g) of 2-(2-chloroethoxy) ethanol. The flask was then heated at 80° C. for 5.5 days, with an additional 0.02 mole of 2-(2-chloroethoxy) ethanol added after 4 days. Water was then removed from the sample first on a rotary evaporator then in a vacuum dessicator to yield a solid residue.

Methanol was then added to dissolve the reaction product, the solution was filtered to remove the undissolved sodium chloride and the methanol removed on the rotary evaporator to yield 52 g of solid product which was then recrystallized from a 5/1 methanol/water mixture. The product was characterized by nmr.

EXAMPLE III

Preparation of 4-(2-(2-(2-Hydroxyethoxy)ethoxy) ethoxy)benzene Sulfonic Acid Sodium Salt (m=3,p=2)

The procedure of Example II was followed with 0.2 mole (33.7 g) of 2-(2-(2-chloroethoxy)ethoxy) ethanol as starting material to yield 57.0 g of solid product which was recrystallized from ethanol.

The compounds prepared in Example I, II and III were extruded with bisphenol-A polycarbonate resin having an intrinsic viscosity in methylene chloride at 25° C. of 0.46 to 0.49, the compound in quantities of 0.000075 mole/100 grams of resin. A sample of sodium p-hydroxy phenyl sulfonate (m=0) and abbreviated as NaPSA in Table I was also prepared. A composition having the same mole percent NaPSA was also prepared. Also present in the composition were 0.075 parts per hundred of a mixture of a phosphite and an epoxide. The admixture was extruded at 265° C.

Parts of dimensions 64 mm×12.7 mm×3.2 mm were prepared by injection molding at 300° C. and tested under UL-94 testing conditions to give the standard test results of $V_0$ (best), $V_1$, $V_2$ and burning (worst). Also injection molded at 300° C. were step chips having the dimensions 76 mm×51 mm with a thickness of 3.2 mm over ⅔ of the length of the part and 1.6 mm over ⅓ the length of the part. These parts were used for measuring the percent haze (% haze) and the Yellowness Index (Y.I.) of the part. The percent haze was determined by ASTM D1003. The Y.I. was determined by ASTM D1925. Also measured and presented below is the Kasha Index, KI, a measurement of melt viscosity. K.I. Units are in centiseconds. The procedure for determining the Kasha Index is as follows: 7 grams of resin pellets, dried a minimum of 90 minutes at 125° C., are added to a modified Tinius-Olsen T3 melt indexer; the temperature in the indexer is maintained at 300° C. and the resin is heated at this temperature for 6 minutes; after 6 minutes the resin is forced through a 0.04125 inch radius orifice using a plunger of radius of 0.1865 inch and an applied force of 17.7 pounds; the time required for the plunger to travel 2 inches is measured in centiseconds and this is reported as the KI. The higher the KI, the higher the melt viscosity and the more viscous the resin, and, therefore, the more difficult to process.

Below are the results

TABLE I

| SALT EXAMPLE | WT. % | UL-94 CLASS | AVERAGE BURN TIME SECONDS | % HAZE | Y.I. | K.I. |
|---|---|---|---|---|---|---|
| no salt | 0 | burning | 32 | 0.4 | 2.0 | 3100 |
| NaPSA | 0.015 | burning | 12.9 | 3.1 | 2.7 | 3000 |
| I | 0.018 | burning | 24.5 | 5.2 | 2.1 | 3035 |
| II | 0.02 | $V_2$ | 11.8 | 5.4 | 2.8 | 3020 |
| III | 0.024 | $V_2$ | 8.7 | 1.4 | 2.6 | 2990 |

The data points in the Table show that increasing the number of ethoxy linkages, m grows larger, increases the flame retardance activity of the compounds. Interestingly, when m is 3, the % haze drops substantially. None of the compounds are significantly detrimental to melt viscosity as measured by K.I. All of the compounds show significant flame retardance activity over the composition containing no flame retardant.

What is claimed is:

1. A composition comprising an admixture of an aromatic polycarbonate and a flame retardant effective amount of a compound of the formula

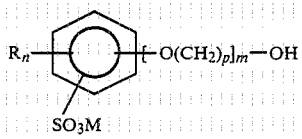

wherein

M is an alkali or alkaline earth metal;

R is alkyl, halo, nitro trihalomethyl or cyano;

m is an integer of one two or three;

n is an integer of zero, one, two, three or four; and p is an integer of two, three, four, five or six.

2. The composition in accordance with claim 1 wherein M is sodium or potassium.

3. The composition in accordance with claim 1 wherein R is chloro, bromo, trifluoromethyl or alkyl of one to six carbon atoms, inclusive.

4. The composition in accordance with claim 1 wherein n is zero, one or two.

5. The composition in accordance with claim 4 wherein M is sodium or potassium; R is chloro, bromo or trifluoromethyl; m is three to about 7; and p is 2.

6. The composition in accordance with claim 5 wherein n is zero.

7. The composition in accordance with claim 5 wherein n is one.

8. The composition in accordance with claim 5 wherein n is two.

9. The composition in accordance with claim 6 wherein $SO_3M$ is para to $[O(CH_2)_p]_mOH$.

10. The composition in accordance with claim 7 wherein $SO_3M$ is para to $[O(CH_2)_p]_mOH$.

11. The composition in accordance with claim 8 wherein $SO_3M$ is para to $[O(CH_2)_p]_mOH$.

12. The compositon in accordance with claim 9 wherein m is one.

13. The composition in accordance with claim 9 wherein m is two.

14. The composition in accordance with claim 9 wherein m is three.

15. The composition in accordance with claim 1 wherein the aromatic polycarbonate is bisphenol-A polycarbonate.

16. The composition in accordance with claim 5 wherein the aromatic polycarbonate is bisphenol-A polycarbonate.

17. The composition in accordance with claim 6 wherein the aromatic polycarbonate is bisphenol-A polycarbonate.

18. The composition in accordance with claim 13 wherein the aromatic polycarbonate is bisphenol-A polycarbonate.

19. The composition in accordance with claim 14 wherein the aromatic polycarbonate is bisphenol-A polycarbonate.

* * * * *